US005079427A

United States Patent [19]

Vlasbloem

[11] Patent Number: 5,079,427

[45] Date of Patent: Jan. 7, 1992

[54] DOSIMETER FOR IONIZING RADIATION

[75] Inventor: Hugo Vlasbloem, Maasland, Netherlands

[73] Assignee: B.V. Optische Industrie "de Oude Delft", Delft, Netherlands

[21] Appl. No.: 635,135

[22] PCT Filed: Aug. 1, 1989

[86] PCT No.: PCT/EP89/00897

§ 371 Date: Dec. 28, 1990

§ 102(e) Date: Dec. 28, 1990

[87] PCT Pub. No.: WO90/01792

PCT Pub. Date: Feb. 22, 1990

[30] Foreign Application Priority Data

Aug. 3, 1988 [NL] Netherlands ........................ 8801937

[51] Int. Cl.[5] ........................................ G01T 1/185

[52] U.S. Cl. .............................. 250/374; 250/385.1

[58] Field of Search ..................... 250/374, 379, 385.1

[56] References Cited

U.S. PATENT DOCUMENTS 2,884,537 4/1959 Swift .................................. 250/374

3,963,924 6/1976 Boag et al. .......................... 250/374

FOREIGN PATENT DOCUMENTS 0174691 3/1986 European Pat. Off. .

59252873 6/1986 Japan .

*Primary Examiner*—Edward P. Westin

*Assistant Examiner*—Richard Hanig

*Attorney, Agent, or Firm*—Louis E. Marn

[57] ABSTRACT

A dosimeter is described that does not show differences in sensitivity over its sensitive area when the ambient pressure changes. To that purpose the measuring chamber and a pressure compensation element together form a single gas tight chamber having at least partially of slack material, wherein the pressure inside the measuring chamber is essentially equal to ambient pressure such that no mechanical distortion of the measuring chamber over its sensitive area takes place.

10 Claims, 1 Drawing Sheet

DOSIMETER FOR IONIZING RADIATION

The invention relates to a dosimeter for one- or two-dimensional dose measurement of ionizing radiation, said dosimeter comprising a flat box-shaped, gas-filled, gastight housing which encloses a measuring chamber and has at least two opposite walls which are transparent to the radiation to be measured, and electrode systems lying opposite each other and between which an electric field prevails when in operation, at least one of the electrode systems being disposed on one of the opposite walls.

Such a dosimeter, which is specrally designed for use as a two-dimensional meter for X-rays passed through a body to be examined in a device for slit radiography, is described in the older Dutch Patent Application 8701122. Such a dosimeter, but designed for use as a one-dimensional meter, is also known from Dutch Patent Application 8503153. In the dosimeters described in the above-mentioned Dutch patent applications the measuring chamber is filled with a special gas or gas mixture such as, for example, xenon, or a mixture of argon and methane. The gas is at approximately atmospheric pressure.

In these dosimeters the problem arises that the opposite side walls, which are transparent to the radiation to be measured, have a tendency to bend when there are variations in the ambient pressure. This problem arises to a greater degree as the dimensions of the housing and in particular of the opposite walls increase. Since these walls carry the electrodes, the distance between individual electrodes lying opposite each other changes when there is a change in the ambient pressure. The bending is greatest in the center of the walls, so that the sensitivity of the meter no longer remains constant over the entire effective surface thereof when the walls bend. Another problem which occurs in the dosimeters according to Dutch Patent Application 8701122 and Dutch Patent Application 8503153 is that special measures are necessary to make these meters capable of withstanding low ambient pressures such as those which can occur, for example, in the hold of an aircraft.

There is therefore a need for a dosimeter for ionizing radiation which both electrically and mechanically is essentially insensitive to variations in the ambient pressure. The object of the invention is to meet this need.

To this end a dosimeter according to the invention is characterized by a pressure compensation element which with the measuring chamber forms a single gastight chamber, which pressure compensation element has at least partially walls of slack, substantially non-elastic and wrinkeable material, which walls of slack material are of such dimensions that said walls of slack material will not stretch tight under ambient pressure variations.

The invention will be explained in greater detail below with reference to the appended drawing.

Figure 1:
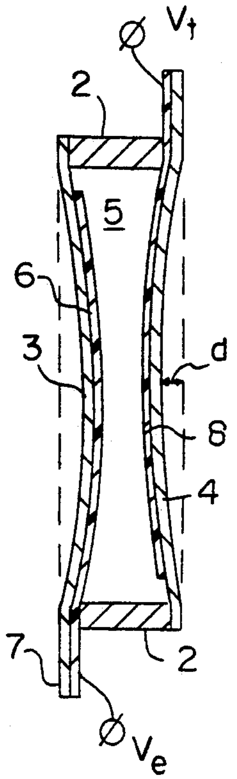
FIG. 1 shows schematically in cross section a box-shaped dosimeter at low ambient pressure.

FIG. 1 shows schematically in cross section a box-shaped dosimeter 1 with a rectangular frame 2 which is clad with thin plates 3, 4 on either side. The plates are made of a material which transmits ionizing radiation, or at least attenuates it as little as possible. A suitable material is, for example, polymethyl methacrylate, normally known as perspex. The frame 2 can also be made of perspex or of another suitable material.

The frame 2 and the plates 3, 4 together enclose a gastight measuring chamber 5 in which a suitable gas or gas mixture, for example xenon or argon and methane, at approximately atmospheric pressure is present.

At least one of the plates has on the inside an electrode system which is schematically indicated at 6. In the example shown the plate 3 bearing the electrode system 6 extends along one edge beyond the frame 2, and the electrode system continues on the edge part 7 in question, so that the required operating voltages Ve can be supplied to the electrode system 6, for example by means of a conventional printed circuit board connector fitting on the edge part.

In the example shown the plate 4 lying opposite bears a counterelectrode system 8 which can be provided with operating voltages Vt in a similar manner. In the older Dutch Patent Application 8701122 various configurations are described for the electrode systems. The electrode systems can be, for example, a number of parallel strip-type electrodes. The strip-type electrodes of one system can extend here parallel to or at right angles to the electrodes of the other system.

In principle, one of the electrode systems can also be made up of a single electrode face which takes up virtually the entire surface of the plate in question.

A guard electrode (not shown) is preferably fitted round one of the two electrode systems.

An electrode system of stretched parallel wires, disposed parallel to and between the two plates, can also be used in conjunction with an electrode system disposed on one of the plates or on both plates.

Such modifications, which are not of essential importance for the present invention, are described in the older Dutch Patent Application 8701122, which may be considered to be incorporated here insofar as is necessary.

In experiments with a dosimeter made of perspex and having a side surface measuring 20×20 cm, and with side plates 2 mm thick, it was found that a pressure variation of 20 millibars already led to bending (d) of approximately 5 mm. This already gives rise to a difference in sensitivity between the center and the edge of the dosimeter.

A dosimeter is, however, in practice subject to much greater variations in the ambient pressure. The dosimeter therefore has to work accurately without problems at an ambient pressure of 680 millibars, i.e. 330 millibars under normal ambient pressure. A dosimeter must also be capable of withstanding the even lower pressures which can occur in the hold of an aircraft.

The problem outlined cannot be solved by making the side plates thicker, because the sensitivity of the meter then decreases, and because thicker plates will also bend in varying ambient pressure.

In practice, the side plates must be as thin as possible, preferably thinner than 1 mm.

Another possibility is to fit the electrodes on individual carriers inside the measuring chamber. The meter is then, however, considerably more complex, and is also thicker. The greatest disadvantage of this solution is, however, that the radiation to be measured then has to pass through not only the carriers, but also the walls of the measuring chamber, and is thus relatively greatly attenuated.

According to the invention, the problem outlined is solved by designing the measuring chamber with a volume varying automatically with the ambient pressure.

Figure 2:
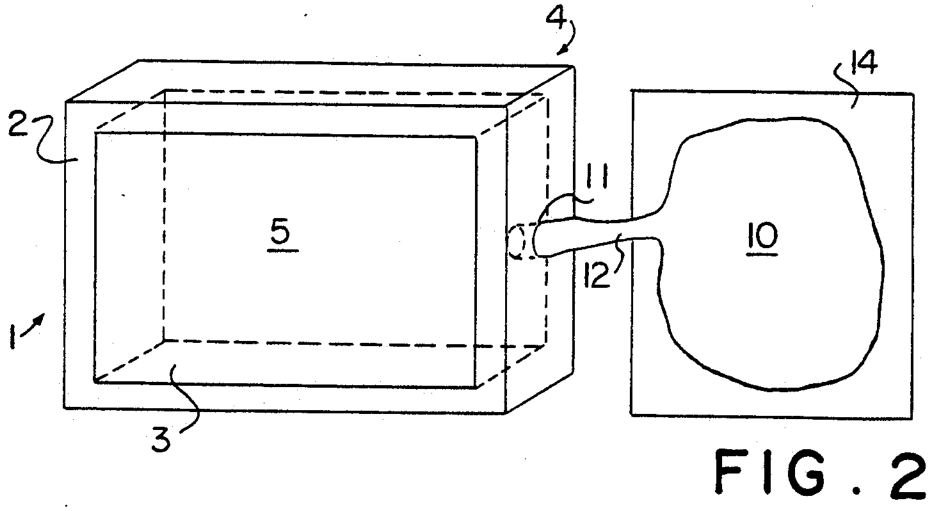
FIG. 2 shows schematically in perspective a first embodiment of a dosimeter according to the invention.

FIG. 2 shows schematically an example of an embodiment of a dosimeter according to the invention. FIG. 2 shows the dosimeter 1 of FIG. 1 with a frame 2 and side plates 3 and 4. For the sake of clarity, the electrode systems are not shown in FIG. 2.

The measuring chamber 5 enclosed by the frame and the side plates is now connected in a gastight manner with a bag 10 of slack material. The bag has as little as possible or no elasticity, and is filled with the same gas as the measuring chamber. In the example shown the connection between the bag 10 and the measuring chamber 5 is a bore 11 through the frame 2 and a hose-type part 12 which connects in gastight fashion to the bore in one of the ways known for the purpose, and which is connected to the bag.

The bore 11 can be disposed in any suitable place in the frame, and can also be made through one of the side plates if desired.

For fastening of the bag a pipe connection piece can be fixed in the bore in an airtight manner; for example by gluing, and the hose-type part 12 can then be fastened thereto by one of the known methods.

It is also possible to use several of such bags.

The at least one bag forms, as it were, a pressurefree space which must have a volume which is so great that at the lowest ambient pressure at which the dosimeter has to be able to work enough gas can flow out of the actual measuring chamber to the bag to make the pressure inside the measuring chamber and the bag essentially equal to the ambient pressure. At even lower ambient pressures, such as those which can occur in an aircraft hold, full pressure compensation is not necessary, but the bag must, of course, be capable of withstanding such partial vacuums.

On the other hand, when the ambient pressure increases gas, flows out of the bag to the measuring chamber, so that the pressure in the measuring chamber then also remains essentially equal to the ambient pressure.

A bag suitable for use as a pressure compensation element can be made of, for example, polyethylene foil Or another suitable slack plastic foil. Good results were also obtained by using a polyethylene foil coated with a metal coating like e.g. aluminium.

The bag is preferably disposed in a non-gastight holder in order to prevent damage. Such a holder is schematically shown at 14. The holder 14 shown is a special holder which leaves the hose-type part 12 free, so that the dosimeter 1 has a certain freedom of movement relative to the pressure compensation element. Depending on the envisaged application, the holder 14 can, however, also be rigidly connected to the dosimeter.

Figure 3:
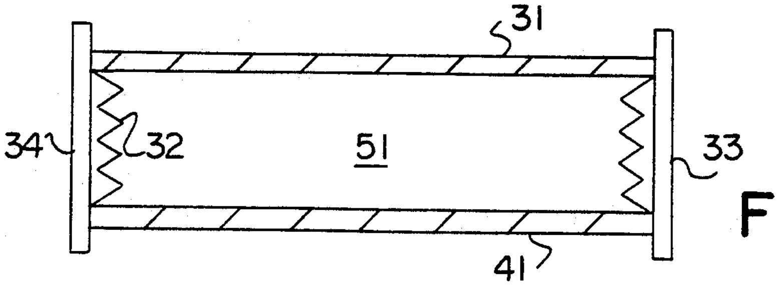
FIG. 3 shows schematically in cross section a second embodiment of a dosimeter according to the invention.

FIG. 3 shows in cross section another example of an embodiment, in which the measuring chamber itself acts as a pressure compensation element. The dosimeter shown in FIG. 3 again comprises two side plates 31, 41 provided with an electrode system, but they are now connected by a rigid frame. The side plates 31, 41 are connected to each other by a slack bellows-type element 32 along the periphery. The measuring chamber 51 is therefore enclosed by the bellows-type element 32 and the side plates 31, 41. A suitable gas or gas mixture is again provided in the measuring chamber, at a pressure of, for example, 1 atm. When the ambient pressure increases the side plates move towards each other, and the bellows-type element 32 is pressed in until the pressure in the measuring chamber is equal to the ambient pressure. The side plates move away from each other in a similar manner with decreasing ambient pressure.

In order to ensure that the side plates remain parallel to each other at all times, guide elements 33, 34, which can be designed as guide plates, bars, rails or the like, are present. A holder (not shown), leaving the side plates 31, 41 free, to protect the bellows-type element is preferably also present. The guide elements can form part of such a housing.

An advantage of such an embodiment, in which the measuring chamber in fact itself acts as the pressure compensation element, is that the number of gas molecules in the measuring chamber always remains the same. This means that the absolute sensitivity of the dosimeter also remains the same, irrespective of the pressure.

Of course, in an embodiment with separate pressure compensation element a pressure-dependent sensitivity compensation can be used.

It is pointed out that, after what has been said above, various modifications are obvious for the expert. For example, in the embodiment shown in FIG. 2 more than one pressure compensation can be used, as already pointed out. Various electrode configurations are also conceivable. The dosimeter can also be designed both for one-dimensional and for two-dimensional use. A combination of the embodiments of FIG. 2 and FIG. 3 is also possible. Such modifications are considered to come within the scope of the invention.

I claim:

1. Dosimeter for one- or two-dimensional dose measurement of ionizing radiation, said dosimeter comprising a flat box-shaped, gas-filled, gastight housing which encloses a measuring chamber and has at least two opposite walls which are transparent to the radiation to be measured, and electrode systems lying opposite each other and between which an electric field prevails when in operation, at least one of the electrode systems being disposed on one of the opposite walls, characterized by a pressure compensation element which with the measuring chamber forms a single gastight chamber, which pressure compensation element has at least partially walls of slack, substantially non-elastic and wrinkeable material, which walls of slack material are of such dimensions that said walls of slack material will not stretch tight under ambient pressure variations.

2. Dosimeter according to claim 1, characterized in that the pressure compensation element comprises at least one bag of slack material which is connected in a gastight manner to the measuring chamber via an aperture in one of the walls of the dosimeter.

3. Dosimeter according to claim 2, characterized in that the at least one bag made of slack material is provided with a hose-type part which connects in a gastight manner to a bore in one of the walls of the dosimeter.

4. Dosimeter according to claim 3, characterized in that the bore is disposed in a rectangular frame connecting the two opposite walls.

5. Dosimeter according to claim 3 or 4, characterized in that a pipe connection piece extending outwards is disposed in the bore.

6. Dosimeter according to one of the preceding claims characterized by a non-gastight housing surrounding the at least one pressure compensation element.

7. Dosimeter according to claim 6, characterized in that the housing is rigidly coupled to the walls lying opposite to each other.

8. Dosimeter according to claim 1, characterized in that the pressure compensation element is at least partially formed by the measuring chamber itself, through the fact that the two opposite walls are connected in a gastight manner to each other via peripheral walls made of slack material which together with the opposite walls enclose the measuring chamber and in that guide elements are present which hold the two opposite walls essentially parallel to each other, and which permit only movement of the two opposite walls away from and towards each other.

9. Dosimeter according to claim 8, characterized in that the peripheral walls are designed in bellows form.

10. Dosimeter according to one of the preceding claims, characterized in that the slack material is polyethylene.

* * * * *